United States Patent [19]
Nutt et al.

[11] Patent Number: 5,991,065
[45] Date of Patent: *Nov. 23, 1999

[54] ADDRESSABLE ELECTRO-OPTIC MODULATOR WITH PERIODICALLY POLED DOMAIN REGIONS

[75] Inventors: Alan C. G. Nutt, Rochester; Mool C. Gupta, Webster, both of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/763,174

[22] Filed: Dec. 10, 1996

[51] Int. Cl.$^6$ ........................................................ G02F 1/03
[52] U.S. Cl. .......................... 359/245; 359/251; 359/252
[58] Field of Search .................................. 359/251, 252, 359/254, 755, 321, 322, 245

[56] References Cited

U.S. PATENT DOCUMENTS 4,281,904  8/1981  Sprague et al. ......................... 350/356
5,193,023  3/1993  Yamada et al. ......................... 359/251

OTHER PUBLICATIONS

Bulmer et al, "Linear Interferometric Modulators in Ti:LiNbO$_3$", Journal of Lightwave Technology, vol. LT–2, No. 4, Aug. 1984.

Davis et al, Nonlinear Frequency Generation and Conversion, SPIE, vol. 2700, Jan., 1996.

C. Baron, H. Cheng, and M.C. Gupta, "Domain inversion in LiTaO$_3$ and LiNbO$_3$ by electric field application on chemically patterned crystals," Appl. Phys. Lett. 68 (4), 1996.

Primary Examiner—Robert H. Kim
Attorney, Agent, or Firm—Raymond L. Owens

[57] ABSTRACT

An electro-optic modulator is described which uses periodic inverted domain regions to permit it to be able to handle high powered optical light.

3 Claims, 5 Drawing Sheets

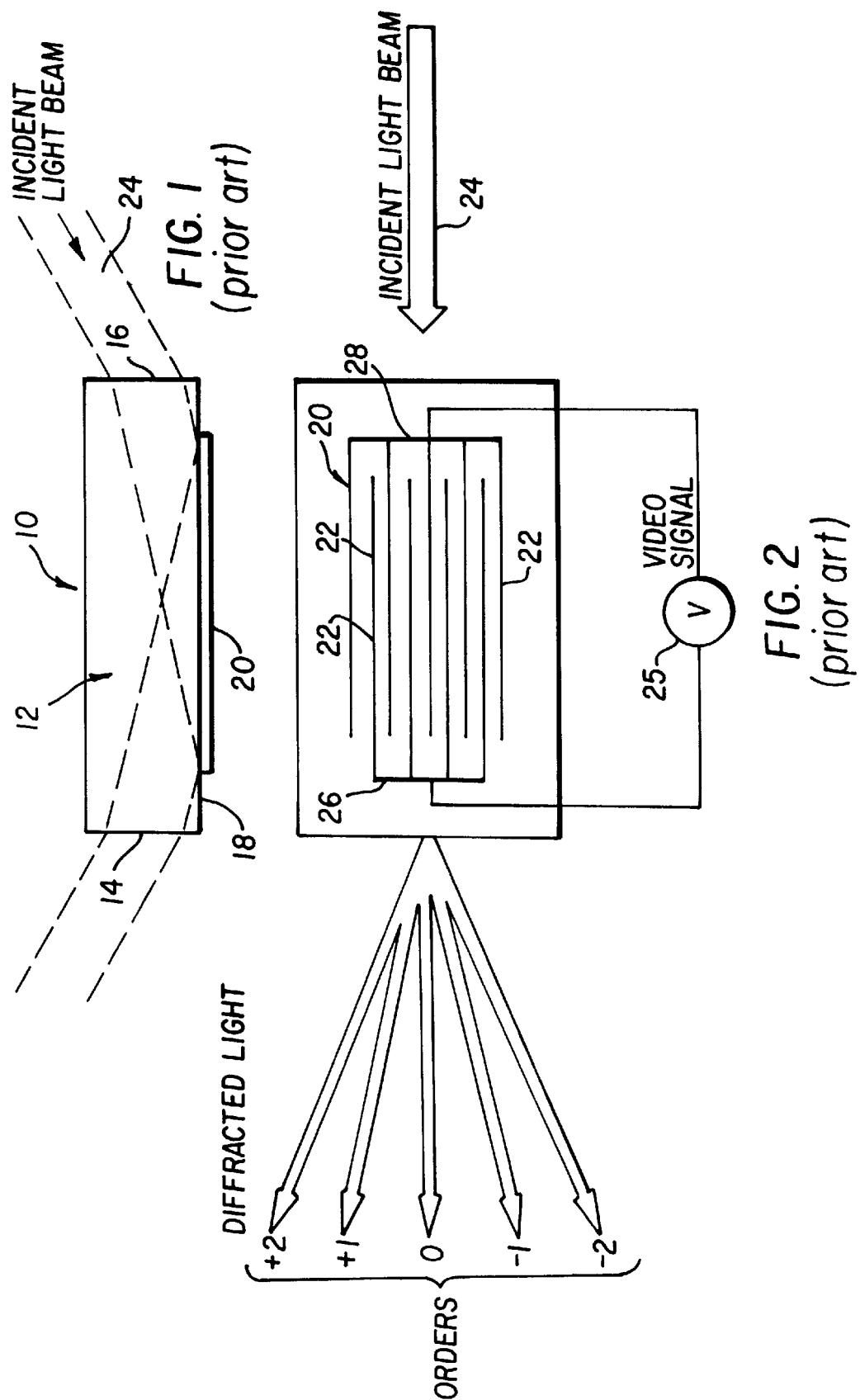

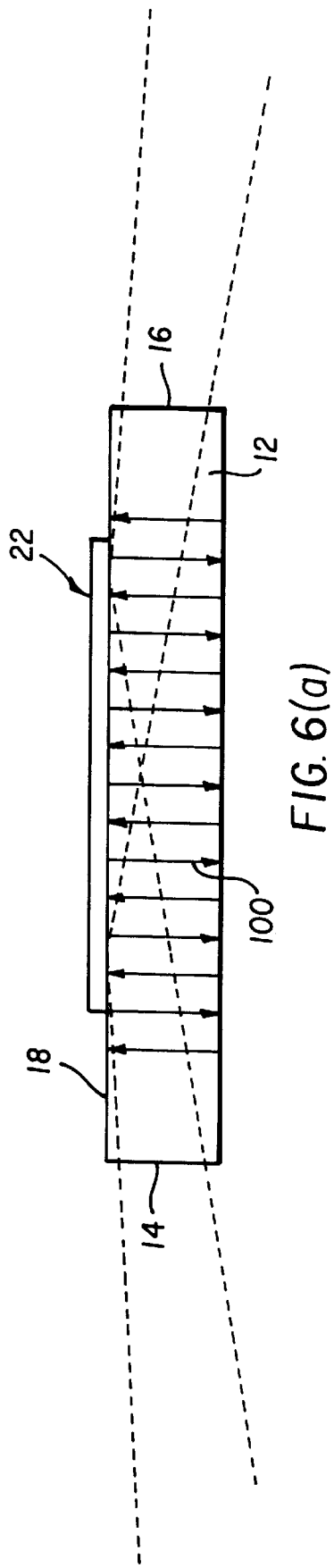

ADDRESSABLE ELECTRO-OPTIC MODULATOR WITH PERIODICALLY POLED DOMAIN REGIONS

CROSS REFERENCE TO RELATED APPLICATION

The present invention is related to U.S. patent application Ser. No. 08/561,141, filed Nov. 21, 1995, entitled "Forming Inverted Ferroelectric Domain Regions", assigned to the assignee of the present invention. The disclosure of this related application is incorporated herein by reference.

FIELD OF THE INVENTION

This invention relates to an electro-optic modulator which can vary phase fronts of a light beam.

BACKGROUND OF THE INVENTION

It is highly desirable to vary the sections of phase fronts of a light beam. For example, as shown in U.S. Pat. No. 4,281,904, there is a device having a crystal formed of electro-optic material such as lithium niobate and lithium tantalate and a patterned array of electrodes formed on the crystal surface. By changing electrical signals to the electrodes, an electric field is selectively produced inside the crystal which alters the refractive index by the electro-optic effect and which selectively modifies the phase front of the incident light beam within the crystal. The modified phase front of the exiting light beam from the crystal is focused to a light stop or to an aperture, which selectively removes portions of the light beam. Thus, the beam of light can be used to print an extended line. It is well known that optical power densities in excess of a few hundred watts/cm$^2$ gives rise to optical damage within the crystal and can cause nonlinear effects in such crystals. For applications that require high optical power levels, this device as shown in U.S. Pat. No. 4,281,904, is ineffective. This is particularly so in printing applications which require high optical power densities necessary for thermal dye transfer printing applications.

More particularly, the apparatus shown in U.S. Pat. No. 4,281,904 modulates a plurality of regions along a line of light by varying the voltage on the electrodes formed on a TIR (total internal reflection) device are well known. In particular, an electrical signal pattern, which includes a plurality of separate electrical signals, is converted to a selected light intensity profile determined by the electrical signal pattern to achieve a visible display of the signal pattern. The individually addressed element of the electro-optic device acts as a light modulator or gate for one picture element along the recording line. As noted above, this device will have serious optical damage problems when used with a high power or intensity optical light beam.

Referring to FIG. 1, a typical prior art TIR modulator 10 consists of electro-optic material formed of a LiNbO$_3$ crystal 12. The crystal 12 has three polished surfaces 14, 16, and 18. The surfaces 14 and 16 are arranged such that a collimated beam of light of single wavelength incident at an angle to the plane of the surface 18 is refracted at the surfaces 14 and 16 to incur TIR at the surface 18. It will be appreciated that other crystal shapes are possible to achieve the TIR.

An electrode pattern is deposited on the surface 18 as an array (shown in FIG. 2) with the electrodes 22 parallel to the incident light beam 24. A voltage V, generated by voltage source 25, is applied to the electrode pattern and includes an electric field to adjacent the surface 18 which alters the refractive index of the crystal. With the pattern shown, the modulator 10 behaves in a similar manner to a phase diffraction grating to alter the light output beam, the interdigitating electrodes 22 introducing a periodic electric field which penetrates the electro-optic material 12.

The output beam is diffracted into a series of orders as shown, separated by approximately 2–6 milliradians, whose intensities vary with electrode voltage. For example, if a typically full modulation voltage V of 70 volts is applied to the electrodes, the output light beam contains minimal zero order energy, the energy being transferred to the other orders. Thus, if these orders are stopped by suitable obstacles (a stop or aperture), the incident or original beam direction can be seen to be intensity modulated by the application of the voltage.

As a typical example, the electrodes are 12 $\mu$m wide and 3.5 mm long, and the pitch between individual electrodes is 50 $\mu$m. Suitable electro-optic materials include LiNbO$_3$, LiTaO$_3$, BSN, ADP, KDP, KTP, and Ba$_2$NaNb$_5$O$_{15}$.

In the TIR configurations which have been made available, all the electrodes are joined into two conducting electrode blocks 26 and 28. A signal drive potential V is then applied to electrode blocks 26 and 28. A periodic light phase front with constant magnitude over the area of electrode pattern results from the drive signal.

FIGS. 3 and 4 are top and side views, respectively, illustrating TIR modulator 29 of another prior art device shown in U.S. Pat. No. 4,281,904. In particular, each electrode is connected to its own individual drive voltage while the other ground 33 is grounded or set to some other common voltage. Specifically, individual interdigitated electrodes 30, 32, 34 . . . 36 and 38 have separate drive voltage signals V$_1$, V$_2$, V$_3$ . . . V$_{j-1}$ and V$_j$, respectively, applied thereto and electrodes 40, 42 . . . 48 are connected together and coupled to a common voltage, ground in the embodiment illustrated. It should be noted that the basic structure of modulator 29 is identical to modulator 10 described hereinabove except for the arrangement of the individually addressed electrodes.

Application of different voltage levels to each of the electrodes 30, 32, 34 . . . 36 and 38 will produce a phase modulation of the beam at the location of each electrode, the magnitude of which is related to the individually applied voltage.

It should be noted that the incident light beam 24 preferably spans the electrodes 30, 32, 34 . . . 36 and 38 to essentially fill the full width of the modulator 29. In a preferred embodiment, the light beam 24 is substantially collimated lengthwise of the modulator 29 and is brought to a wedge shaped focus on an internal surface of the modulator 29 which extends widthwise along the electrodes 30, 32, 34 . . . 36 and 38.

To use the phase front modulations to achieve intensity variations in the output (i.e. to provide the line composer), phase microscopy techniques may be used so that each electrode affects the image intensity distribution within a localized region of the image line. This region of the image line corresponds directly to the location of the electrode within the array of electrodes.

Phase microscopy techniques for such conversion are described, for example, in J. W. Goodman, Introduction to Fourier Optics, McGraw-Hill Book Company, New York, 1968, pps. 141–146, including the central dark ground technique described therein. All phase microscopy techniques convert a phase front modulation into a corresponding intensity modulation by spatial filtering, the various techniques differing in the spatial filtering function used.

In TIR devices described above have inherent problems in handling higher light power densities causing beam distortion. These power densities are dependent upon the wavelength of light. For example, in Bulmer et al, "Linear Interferometric Modulators in Ti:LiNbO$_3$", Journal of Lightwave Technology, Vol. LT-2, No. 4, August 1984, describes that optical damage in channel waveguides was observed at 300 W/cm$^2$ at wavelength at 0.84 μm. Such optical damages is unacceptable in printing devices and other applications.

Davis et al (Nonlinear Frequency Generation and Conversion, SPIE, Vol. 2700, January, 1996) observed a significant decrease in optical damage by periodic reversal of ferroelectric domains.

SUMMARY OF THE INVENTION

It is an object of the present invention to improve the performance of TIR modulators by minimizing the optical damage caused by photorefractive effects.

This object is achieved by a TIR electro-optic modulator for modulating a light beam, comprising:

a) a crystal defining X, Y, and Z axes and being formed of electro-optic material;

b) a plurality of periodically poled domains formed in the crystal parallel to the Z axis of the crystal; and c) an electrode pattern array formed over the periodically poled domains and arranged such that when a voltage is applied to various electrodes, it creates a field that alters sections of a light beam passing along the X or Y axis of the crystal.

ADVANTAGES

An advantage of the present invention is the provision of a TIR based modulator device with periodic ferroelectric domain inversion which minimizes optical damage caused by high powered light beams.

BRIEF DESCRIPTION OF THE DRAWINGS

FIG. 1 shows a schematically and illustratively a side view of a prior art type modulator device;

FIG. 2 shows a top view of the device of FIG. 1 using a conventional electrode pattern;

FIG. 6a is a cross sectional of a TIR device with periodic domain regions; and

DETAILED DESCRIPTION OF THE INVENTION

Figure 3:
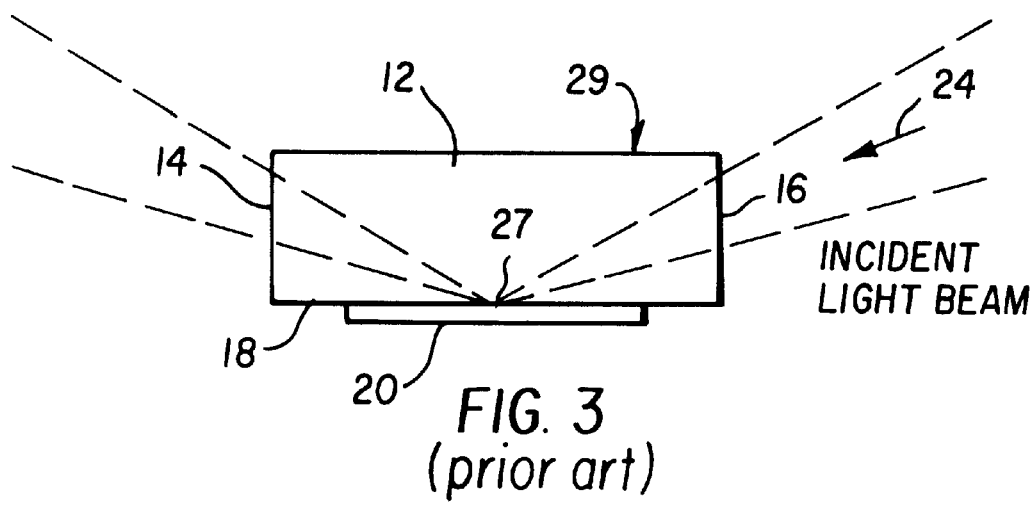
FIG. 3 illustrates a prior art TIR modulator concept.
Figure 4:
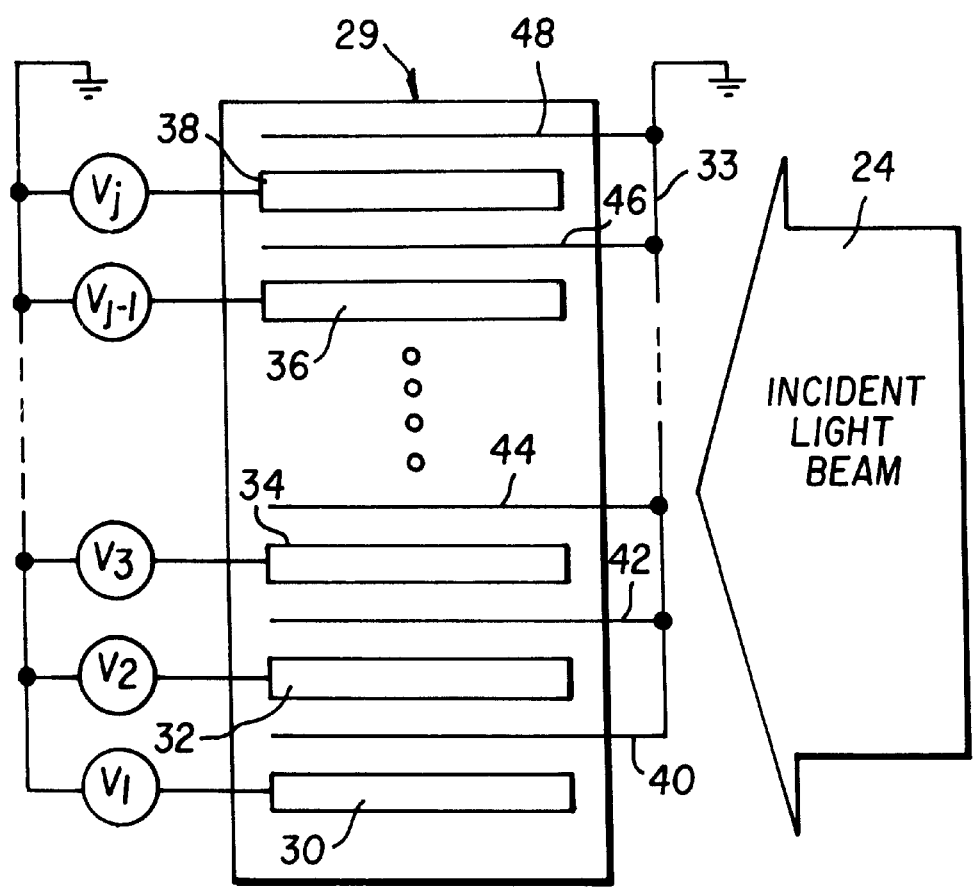
FIG. 4 illustrates the electrode pattern on a prior art TIR modulator.

Where parts correspond to those shown in the described prior art of FIGS. 1 and 2, the same reference numerals will be used. For clarity of illustration where the functions are similar, they may not be described.

Figure 6B:
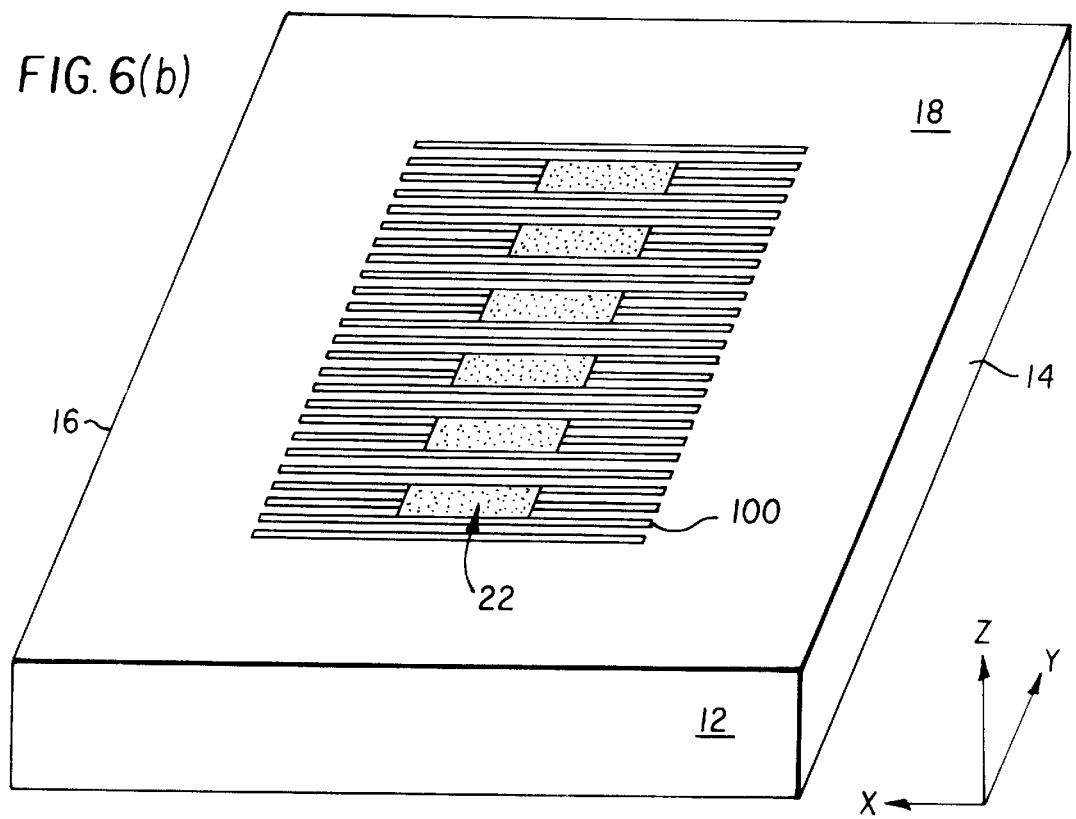
FIG. 6b and FIG. 6c are pictorials illustrating the top view of a TIR modulator of FIG. 6a with periodic domain regions with FIG. 6b showing the electrodes parallel to the domain regions and FIG. 6b showing them perpendicular.
Figure 6C:
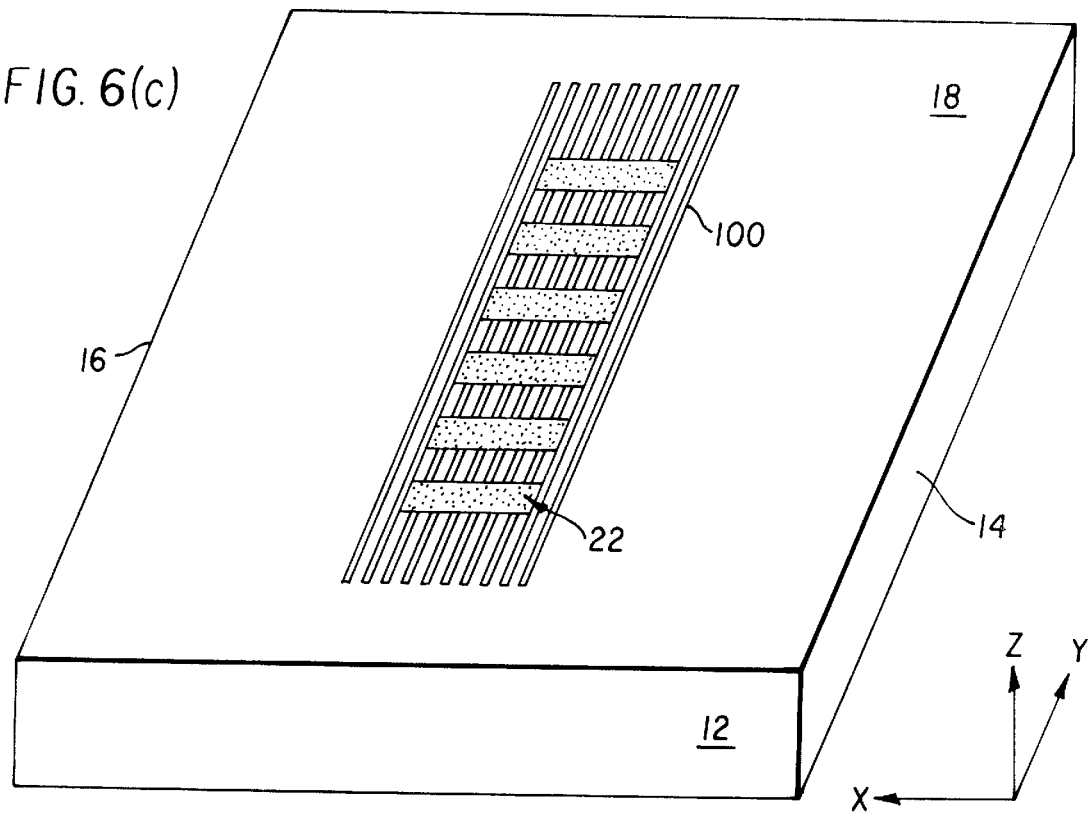

The present invention is directed to an improved TIR modulator which is particularly shown in FIGS. 6a, 6b, and 6c. As shown in FIGS. 6a, 6b, and 6c, the Z axis is perpendicular to the X, Y plane. In other formats, the Z axis could be in the plane of the crystal. In both cases, the periodically poled domains can be formed by similar processes well known in the art such as described in the above identified U.S. patent application Ser. No. 08/561,141, filed Nov. 21, 1995.

In FIGS. 6a, 6c, and 6c, the crystal 12 is electro-optic and can be made of a ferroelectric material such as lithium tantalate, lithium niobate or potassium titanyl phosphate (KTP). It will be understood that the crystal 12 can include any ferroelectric material which exhibits useful optical properties.

The crystal 12 has three polished surfaces 14, 16, and 18. The surfaces 14 and 16 are arranged such that collimated beam of light of a single wavelength incident at an angle to the plane of the top surface 18 is refracted at the surfaces 14 and 16 to incur TIR at the surface 18. The external surfaces of the crystal 12 are rectangular. The crystal 12 defines X, Y, and Z axes as shown. The light source can be a laser or light emitting diode (LED) or other incoherent light source.

In order to form periodically inverted domains in the crystal 12, for instance, doping material is provided through openings in a mask which chemically modifies the ferroelectric crystal in selected regions under the openings. After the doping process is completed, an electric field is applied to pole the domains and they will remain permanently in the poled position. For a complete discussion of this process of forming periodically inverted domain regions in a crystal, see C. Baron, H. Cheng, and M. C. Gupta, "Domain inversion in LiTaO$_3$ and LiNbO$_3$ by electric field application on chemically patterned crystals," Appl. Phys. Lett. 68 (4), 1996.

Dopant materials can be introduced by methods such as ion exchange by immersion in selected acids and molten salts heated to elevated temperatures such as pyrophosphoric and benzoic acids and ion implantation followed by removal of the mask material by immersion in suitable solvents such as HF and dilute acid.

As shown in FIG. 6a, periodically poled regions are shown under the electrodes 22 and are parallel to the Z axis but are perpendicular to the surface 18. It is also possible to have the periodically poled regions that are parallel to the Z axis but are in the plane of the surface 18.

Figure 5A:
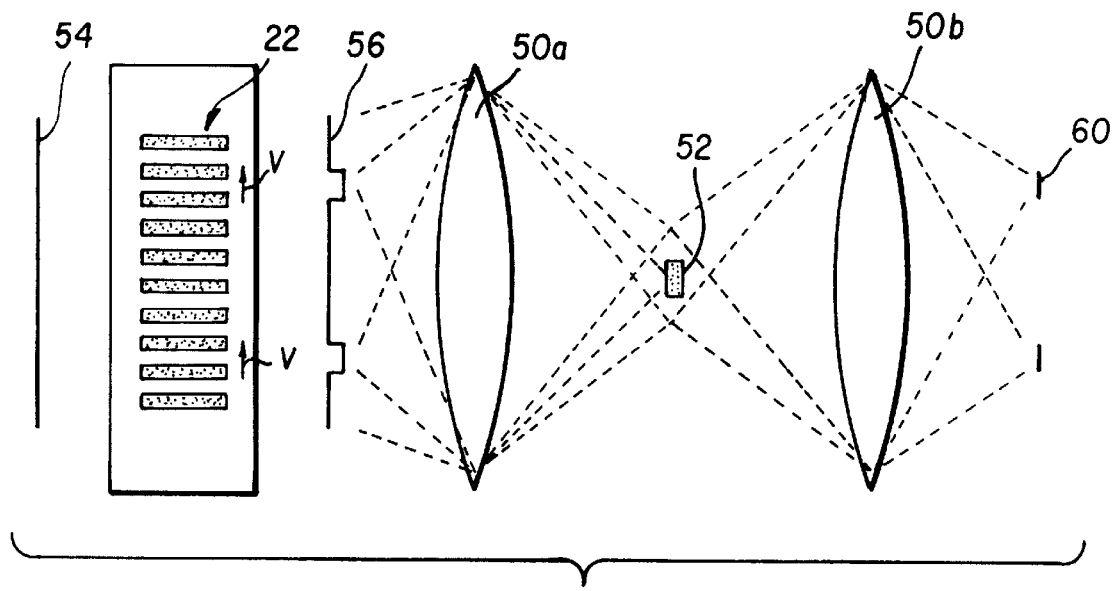
FIG. 5a shows a schematic top view of the modulator of FIGS. 3 and 4 including optics having a stop and the output of such optics in accordance with the present invention.
Figure 5B:
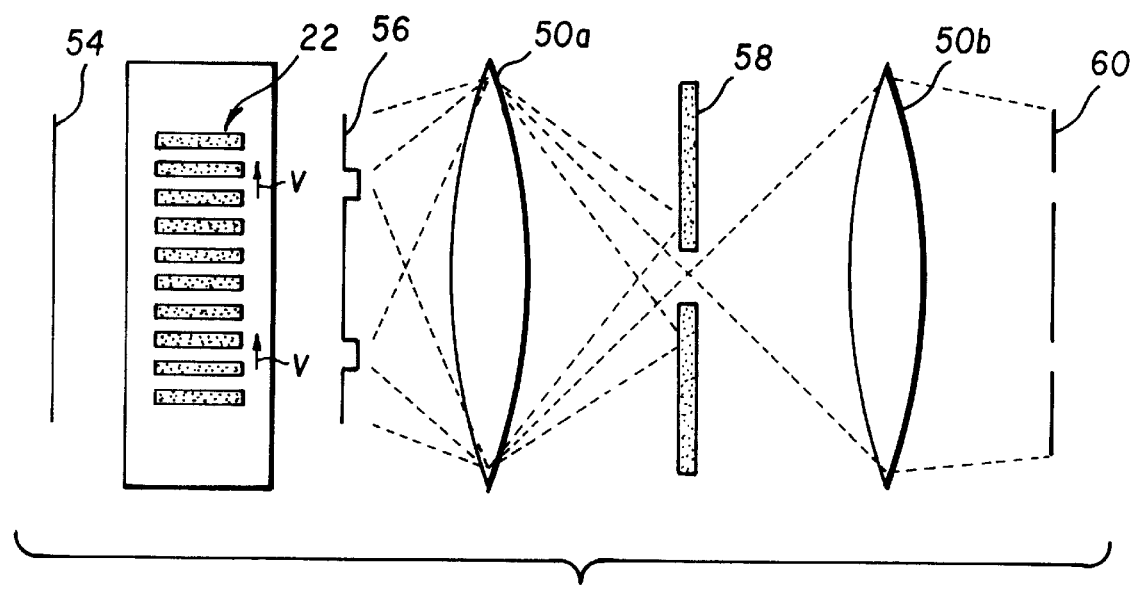
FIG. 5b shows a schematic view similar to FIG. 5a but with the optics provided with an aperture rather than a stop.

In both FIGS. 6b and 6c, the electrodes 22 form an electrode pattern array formed over the periodically inverted domain regions 100 and arranged such that when an voltage is applied to various electrodes, it produces a field that alters sections of a light beam passing along the X or Y axis of the crystal 12. In accordance with the present invention, it has been found that with periodically poled domains, much higher optical power levels can be used than has heretofore been thought possible with no degradation in output perfonnance. Both FIGS. 5a and 5b show the modified phase front of a collimated beam of light exiting the modulator. Optics are provided in both these views which include two separate lenses 50a and 50b. As shown in FIG. 5a, a stop 52 is provided. The stop 52 blocks light from passing and is provided in the focal or Fourier plane of these lenses 50a and 50b. In this way, the output of the modulator can be used in printing applications.

Returning to FIG. 5a, it illustrates the operation of a TIR device. An input light beam 54 is incident on electro-optic crystal surface 18 and its phase front is modified by application of voltage to the electrodes 22 formed on surface 18. The output beam has a selectively modified phase front 56.

This beam is focused by lens 50*a*. An optical stop 52 is placed at the focal point of the beam. The section of the light beam whose phase front is unmodified gets blocked by stop 52. The beam whose phase front was modified is imaged by lens 50*b* on a printing medium. The combination of the lenses and the stop focuses the non-phase shifted light on the stop and the phase shifted light onto a recording medium. The exposure of the light beam on the printing medium in the image plane 60 provides the desired image.

In FIG. 5*b*, an aperture is provided at the focal or Fourier plane and this device functions similarly to that described in FIG. 5*a*. However, in this arrangement, the non-phase shifted light is focused to pass through the aperture for recording onto a recording medium. The phase shifted light is blocked by the structure that forms the aperture 58.

Each electrode pair/group creates one phase front modification and is effectively one pixel in the image. If the stop is used, only the phase modified regions (i.e. pixels) are imaged onto the printing medium 60. In an aperture device, the phase modified pixels are blocked, therefore the resultant line image has holes created by these pixel omissions. This is useful where high overall light power is required, such as in ablation printing. The voltages necessary for each of these data types are typically the binary inverse of each other.

The invention has been described in detail with particular reference to certain preferred embodiments thereof, but it will be understood that variations and modifications can be effected within the spirit and scope of the invention. It should also be understood that there are many different optical modulator schemes whose performance using a high powered light source can be improved by periodic reversal of domains.

Parts List
10 device or modulator
12 crystal or electro-optic material
14 polished end-face or polished surface
16 polished end-face or polished surface
18 top surface or polished surface
22 conductive electrode or interdigitating electrodes
24 incident light beam
25 voltage source
26 electrode block
27 line
28 electrode block
29 TIR modulator
30 one electrode
32 electrode
33 ground
34 electrode
36 electrode
38 electrode
40 electrode
42 electrode
44 electrode
46 electrode
48 electrode
50*a* lens
50*b* lens
52 stop
54 input light beam
56 modified phase front
List (con't)
58 aperture
60 image plane or printing medium
100 inverted domain regions

We claim:

1. An electro-optic TIR modulator for modulating a light beam produced by a non-modulated light source, comprising:

a) a crystal defining X, Y, and Z axes and being formed of electro-optic material;

b) a plurality of periodically poled domains formed in the crystal parallel to the Z axis of the crystal;

c) an electrode pattern array formed over the periodically poled domains and arranged such that when a voltage is applied to various electrodes, it creates a field that alters sections of a light beam passing along the X or Y axis of the crystal; and d) means for applying voltages to various electrodes of the electrode pattern array to create modulated fields in the crystal that alter different sections of the light beam passing along the X or Y axis of the crystal.

2. The modulator as set forth in claim 1 further including optical means including a stop and at least one lens means for focusing the non-phase shifted light on the stop and the phase shifted light onto a recording medium.

3. The modulator as set forth in claim 1 further including optical means defining an aperture and at least one lens for focusing the non-phase shifted light through the aperture for recording onto a recording medium.

* * * * *